US012562658B2

(12) United States Patent
Kyung et al.

(10) Patent No.: US 12,562,658 B2
(45) Date of Patent: Feb. 24, 2026

(54) SOFT HAPTIC DEVICE AND METHOD OF LOCAL CONTROL THEREIN

(71) Applicant: KOREA ADVANCED INSTITUTE OF SCIENCE AND TECHNOLOGY, Daejeon (KR)

(72) Inventors: Ki-Uk Kyung, Daejeon (KR); Seung-Yeon Jang, Daejeon (KR); Hyunwoo Kim, Daejeon (KR); Minjae Cho, Daejeon (KR); Minki Kim, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 271 days.

(21) Appl. No.: 18/531,102

(22) Filed: Dec. 6, 2023

(65) Prior Publication Data

US 2024/0313669 A1 Sep. 19, 2024

(30) Foreign Application Priority Data

Dec. 6, 2022 (KR) ......................... 10-2022-0168306
Dec. 5, 2023 (KR) ......................... 10-2023-0174930

(51) Int. Cl.
*H02N 1/00* (2006.01)
*G06F 3/01* (2006.01)
*H02N 2/00* (2006.01)

(52) U.S. Cl.
CPC ............. *H02N 1/008* (2013.01); *G06F 3/016* (2013.01); *H02N 2/008* (2013.01)

(58) Field of Classification Search
CPC ........ H02N 1/008; H02N 2/008; G06F 3/016; G06F 3/01
See application file for complete search history.

(56) References Cited

U.S. PATENT DOCUMENTS

| | | | | |
|---|---|---|---|---|
| 7,320,457 B2 * | 1/2008 | Heim | .................... | F04B 35/045 251/129.06 |
| 10,345,905 B2 * | 7/2019 | McClure | ................. | G06F 3/016 |
| 11,372,481 B2 * | 6/2022 | Leroy | .................... | G06F 3/016 |
| 2021/0295661 A1 | 9/2021 | Tadele et al. | | |

FOREIGN PATENT DOCUMENTS

| | | |
|---|---|---|
| KR | 10-1579632 B1 | 12/2015 |
| KR | 10-2089448 B1 | 3/2020 |
| KR | 10-2021-0086518 A | 7/2021 |
| KR | 10-2022-0164414 A | 12/2022 |
| WO | 2009/123769 A1 | 10/2009 |

OTHER PUBLICATIONS

Edouard Leroy, et al., "Multimode Hydraulically Amplified Electrostatic Actuators for Wearable Haptics", Communication, Advanced Materials, vol. 32, 2002564, 2020, pp. 1-9.

* cited by examiner

*Primary Examiner* — Tulsidas C Patel
*Assistant Examiner* — Mohammed Ahmed Qureshi
(74) *Attorney, Agent, or Firm* — Sughrue Mion, PLLC

(57) ABSTRACT

A soft haptic device and a local control method are disclosed. The soft haptic device includes a soft actuator. The soft actuator includes an electroactive polymer film, a patterned electrode, and a dielectric liquid injected between the electroactive polymer film and the patterned electrode. The soft actuator generates a reconfigurable shape such that a form of an output shape and a number of outputtable shapes are changed depending on the number of electrodes constituting the patterned electrode, a shape of the electrodes, and an arrangement of the electrodes.

15 Claims, 7 Drawing Sheets

SOFT HAPTIC DEVICE AND METHOD OF LOCAL CONTROL THEREIN

CROSS-REFERENCE TO RELATED APPLICATION

This application is based on and claims priority under 35 U.S.C. § 119 to Korean Patent Application Nos. 10-2022-0168306 and 10-2023-0174930, respectively filed on Dec. 6, 2022 and Dec. 5, 2023, in the Korean Intellectual Property Office, the disclosures of which are incorporated by reference herein in their entireties.

BACKGROUND

1. Field

The disclosure relates to a soft haptic device. More particularly, the disclosure relates to a local control method for a soft haptic device.

2. Description of the Related Art

Existing shape-variable input/output devices include a plurality of resonance-actuating type linear actuators arranged in a lattice form in order to perform local shape control. Such existing shape-variable input/output devices may perform local shape control by using linear actuator arrays, but in this case, there are limitations in device miniaturization.

Prior-Art Document

Patent Document

KR101579632B1

SUMMARY

Provided is a soft haptic device capable of dynamically or statically outputting various reconfigurable shapes, accepting an input such as a user's touch and press, and providing vibration feedback in response to the input.

Additional aspects will be set forth in part in the description which follows and, in part, will be apparent from the description, or may be learned by practice of the presented embodiments of the disclosure.

According to an embodiment, a soft haptic device includes a soft actuator. The soft actuator includes an electroactive polymer film, a patterned electrode, and a dielectric liquid injected between the electroactive polymer film and the patterned electrode. The soft actuator generates a reconfigurable shape such that a form of an output shape and a number of outputtable shapes are changed depending on a number of electrodes constituting the patterned electrode, a shape of the electrodes, and an arrangement of the electrodes. The dielectric liquid generates a hydraulic pressure as the dielectric liquid flows to an area where no electrostatic attractive force acts between the electroactive polymer film and the patterned electrode and no resistance is applied to a flow of the dielectric liquid, and the electroactive polymer film is stretched due to the hydraulic pressure.

According to an embodiment, the soft actuator may generate the reconfigurable shape, when a restoring force of the electroactive polymer film stretched due to the hydraulic pressure, a pressure of the dielectric liquid, and an electrostatic force acting between the patterned electrode and a soft electrode disposed on the electroactive polymer film are in equilibrium.

According to an embodiment, when a voltage is applied to the patterned electrode, electrical zipping may occur from an area where an initial gap is smallest between an outermost portion of an individual electrode constituting the patterned electrode to which the voltage is applied and the electroactive polymer film and, when the restoring force of the electroactive polymer film, the pressure of the dielectric liquid, and the electrostatic force acting between the patterned electrode and the soft electrode disposed on the electroactive polymer film are in equilibrium, the electrical zipping may end.

According to an embodiment, local control of the soft actuator may be performed through the patterned electrode.

According to an embodiment, the form of the output shape may be changed through the local control.

According to an embodiment, the form of the output shape may be dynamically changed through the local control.

According to an embodiment, the soft actuator may perform the local control to segment and dispose the dielectric liquid in a fluid path.

According to an embodiment, the soft haptic device may further include a sensing unit including a sensor disposed under a substrate layer beneath the patterned electrode and recognizing an input applied to the soft actuator.

According to an embodiment, the input applied to the soft actuator may include a touch, a press, and a gesture.

According to an embodiment, when a sensing signal is generated from the sensing unit, vibration feedback may be provided by adjusting a frequency of a voltage applied to the soft actuator.

According to an embodiment, a method of actuating in a soft haptic device includes starting electrical zipping in an area where an initial gap is smallest between an outermost portion of an individual electrode constituting a patterned electrode to which a voltage is applied and an electroactive polymer film, in a soft actuator including a dielectric liquid injected between the electroactive polymer film and the patterned electrode, propagating the electrical zipping, when the dielectric liquid generates a hydraulic pressure as the dielectric liquid starts to flow from the area where the initial gap is smallest and flows to an area where no electrostatic attractive force acts between the electroactive polymer film and the patterned electrode and no resistance is applied to a flow of the dielectric liquid, and ending the electrical zipping, when a restoring force of the electroactive polymer film caused by the stretching of the electroactive polymer film due to the hydraulic pressure, a pressure of the dielectric liquid, and an electrostatic force acting between the patterned electrode and the soft electrode disposed on the electroactive polymer film are in equilibrium.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2 illustrates various three-dimensional shapes that are generated through local control from a patterned electrode of the soft haptic device shown in FIG. 1, according to an embodiment;

FIG. 3 is a conceptual diagram illustrating in detail a process of forming two hemispherical shapes when a voltage is applied only to one electrode of the soft haptic device shown in FIG. 1, according to an embodiment;

DETAILED DESCRIPTION

Figure 1:
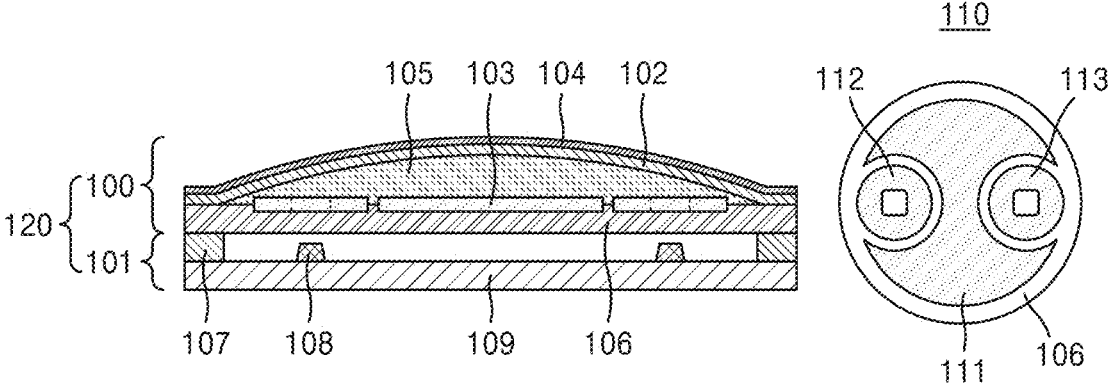
FIG. 1 illustrates a cross-sectional view of a soft haptic device according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

A description is made below with reference to the drawings.

Figure 2:
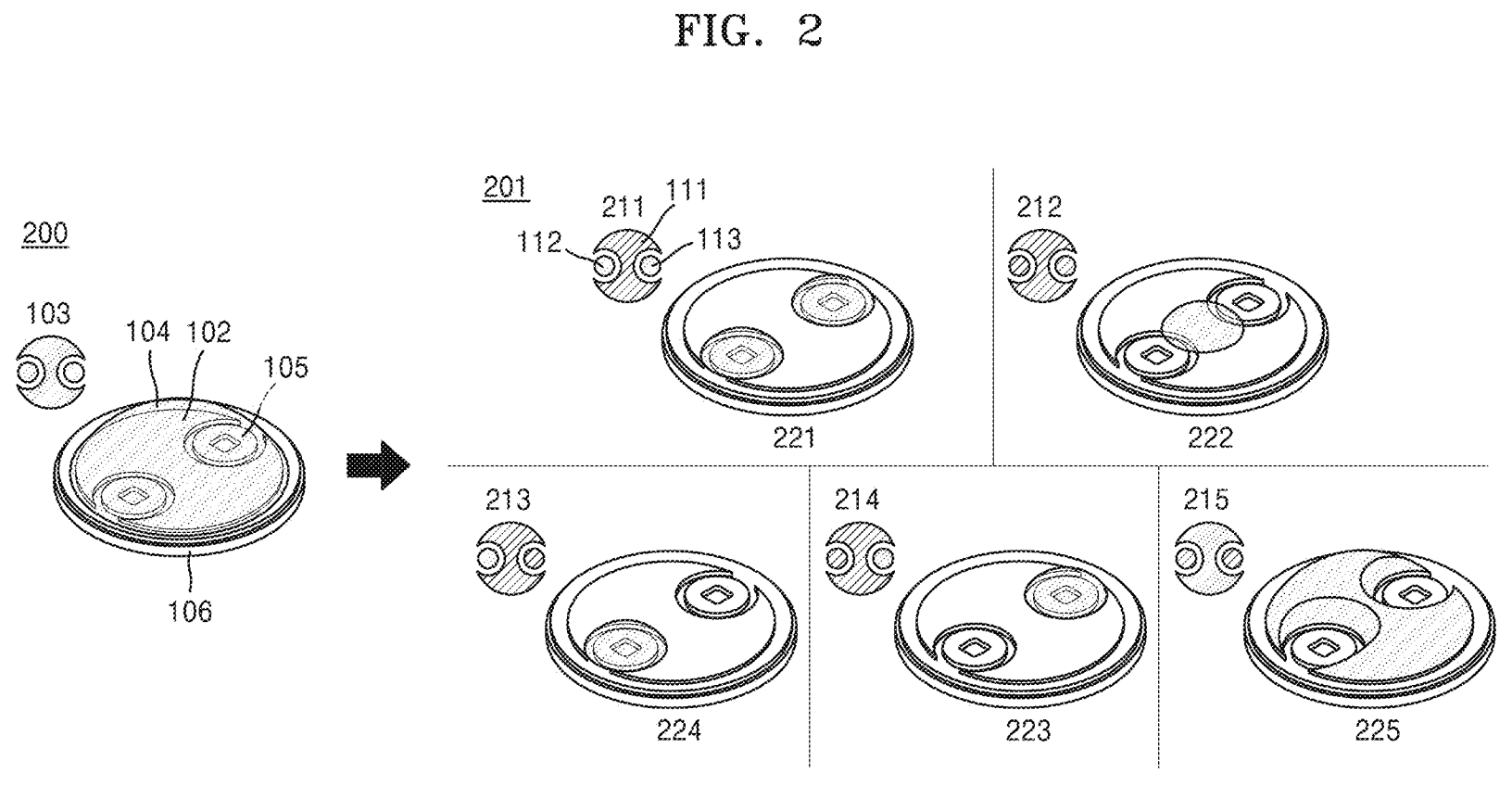

FIG. 1 illustrates a cross-sectional view of a soft haptic device according to an embodiment. FIG. 2 illustrates various three-dimensional shapes that are output through local control from a patterned electrode of the soft haptic device shown in FIG. 1, according to an embodiment. In an embodiment, the soft haptic device 120 may output various three-dimensional shapes that are reconfigurable by changing a physical shape through local control.

Referring to FIG. 1, the soft haptic device 120 may include a soft actuator 100 and a sensing unit 101.

The soft actuator 100 may be comprised of an electroactive polymer film 102, a patterned electrode 103, a dielectric liquid 105 injected between the electroactive polymer film 102 and the patterned electrode 103, a soft electrode 104 disposed on the electroactive polymer film 102, and a substrate layer 106 disposed beneath the patterned electrode 103. The patterned electrode 103 may operate as an anode electrode, and the soft electrode 104 may operate as a cathode electrode.

As an example of the electroactive polymer film 102 constituting the soft actuator 100, a functional electroactive polymer may be used. The electroactive polymer may be prepared by mixing polyvinyl chloride (PVC) with a plasticizer. The plasticizer may include phthalate-based Di-butyl-phthalate (DBP), Di-2-ethylhexyl phthalate (DEHP (=DOP)), Dioctyl phthalate (DOP), Dioctyl terephthalate (DOTP), or adipate-based Dibutyl adipate (DBA), di-2-ethylhexyl adipate (DEHA), etc.

The patterned electrode 103 may determine an output shape of the soft actuator 100. A form of the output shape and a number of outputtable shapes may vary depending on a number of electrodes constituting the patterned electrode 103, a shape of the electrodes, an arrangement of the electrodes, etc.

Referring to an embodiment 110 illustrating a top view of the patterned electrode 103 shown in FIG. 1, the patterned electrode 103 may consist of three individual electrodes 111,

112, and 113. A voltage may be applied independently to the three individual electrodes 111, 112, and 113. The embodiment 110 of the patterned electrode 103 shown in FIG. 1 may output various reconfigurable three-dimensional shapes 221 to 225, which also be presented in two-dimensional shapes 211 to 215 as shown in FIG. 2.

In an embodiment, the reconfigurable shape may mean a shape that is formed through the in-plane flow of the dielectric liquid 105 inside the soft actuator 100. The reconfigurable shape may include all of a shape seamlessly connected to an adjacent area and a shape disconnected from the adjacent area.

Referring to FIG. 2, in an initial state 200 where no voltage is applied to the three electrodes 111, 112 and 113 of the patterned electrode 103, the dielectric liquid 105 inside the soft actuator 100 may be distributed evenly on a substrate and thus have a relatively flat shape. When power is supplied to the patterned electrode 103 and the soft electrode 104 from the outside of the soft actuator 100, electrostatic force may be generated between the patterned electrode 103 and the soft electrode 104. The patterned electrode 103 may operate as an anode electrode, and the soft electrode 104 may operate as a cathode electrode.

Owing to this, electrical zipping in which electroactive high molecules stick to the patterned electrode 103 may occur starting from a location where a distance between the patterned electrode 103 and the soft electrode 104 is smallest, and accordingly the internal dielectric liquid 105 may flow. The dielectric liquid 105 may flow, until the electrostatic force generated between the patterned electrode 103 and the soft electrode 104, a pressure of the dielectric liquid 105, and the elastic force of the electroactive polymer film 102 stretched by the pressure of the dielectric liquid 105 are in equilibrium. According to this principle, an output shape of the soft actuator 100 may be determined.

Accordingly, a three-dimensional shape 201 to be output by the soft actuator 100 may be determined according to a method of applying a voltage to the patterned electrode 103 shown in FIG. 1. In FIG. 2, five various forms are shown as examples of the three-dimensional shape 201 output when a voltage is applied to the soft actuator 100.

When a voltage is applied to the first electrode 111 and no voltage is applied to the second electrode 112 and third electrode 113 among the three electrodes 111, 112, and 113 constituting the patterned electrode 103 of FIG. 1, a first three-dimensional shape 221 may be output. The first three-dimensional shape 221 may be two hemispherical shapes formed by segmenting and separating the internal dielectric liquid 105. A process of outputting the hemispherical shape is described in detail with reference to FIG. 3.

When a voltage is applied to all the three electrodes 111, 112, and 113 constituting the patterned electrode 103 of FIG. 1, a second three-dimensional shape 222 may be output. At this time, electrical zipping may occur from an edge of the soft actuator 100. The edge of the soft actuator 100 is a portion where an initial distance between the patterned electrode 103 and the soft electrode 104 is smallest, and may mean a portion where the thickness of the internal dielectric liquid 105 is smallest. In this portion, electrostatic force may act most according to Coulomb's law. Since a voltage is applied to all the three electrodes 111, 112, and 113, the electrical zipping may propagate toward a central portion of the soft actuator 100. Accordingly, due to the incompressibility of fluid, the internal dielectric liquid 105 may gather in the central portion of the soft actuator 100 and form a hydraulic pressure, and the electroactive polymer film 102 having flexibility may be stretched by the hydraulic pressure. As a result, a hemispherical shape may be formed in the central portion of the soft actuator 100 (222).

When a voltage is applied to the first electrode 111 and second electrode 112 and no voltage is applied to the third electrode 113 among the three electrodes 111, 112, and 113 constituting the patterned electrode 103 of FIG. 1, a third three-dimensional shape 223 may be output. A hemispherical shape may be formed in an area where no electrostatic attractive force acts, that is, in an area 113 where no voltage is applied (223).

When a voltage is applied to the first electrode 111 and third electrode 113 and no voltage is applied to the second electrode 112 among the three electrodes 111, 112, and 113 constituting the patterned electrode 103 of FIG. 1, a fourth three-dimensional shape 224 may be output. A hemispherical shape may be formed in an area where no electrostatic attractive force acts, that is, in an area 112 where no voltage is applied (224).

When a voltage is applied to the second electrode 112 and third electrode 113 and no voltage is applied to the first electrode 111 among the three electrodes 111, 112, and 113 constituting the patterned electrode 103 of FIG. 1, a fifth three-dimensional shape 225 may be output. A shape such as the fifth three-dimensional shape 225 may be output since electrical zipping occurs only at the second electrode 112 and the third electrode 113.

As an embodiment, the soft haptic device 120 may not only output various reconfigurable shapes through the soft actuator 100, but also may include the sensing unit 101 coupled to the soft actuator 100. This is described with reference to FIGS. 4 and 5.

Figure 4:
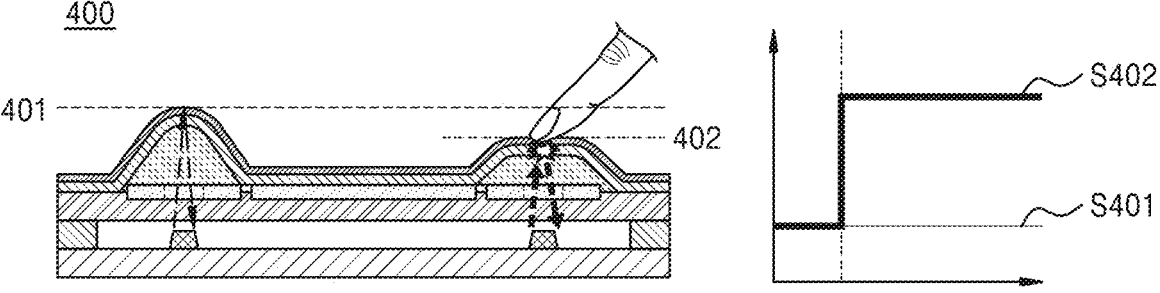
FIG. 4 illustrates an example of recognizing a user's touch through a sensing unit in a soft haptic device, according to an embodiment.

The sensing unit 101 may consist of support structures 107 and 109 for connecting and supporting the soft actuator 100 and the sensing unit 101, and a sensor 108. The sensing unit 101 may recognize an input such as user's touch, gesture, and press through the sensor 108. FIG. 4 illustrates an example of recognizing a user's touch through the sensing unit 101 in the soft haptic device 400, according to an embodiment. In the soft haptic device 400, when the sensing unit 101 does not recognize a user's touch (401), a sensing signal S401 may not be generated. When the sensing unit 101 recognizes a user's touch (402), a sensing signal S402 may be generated.

Figure 5:
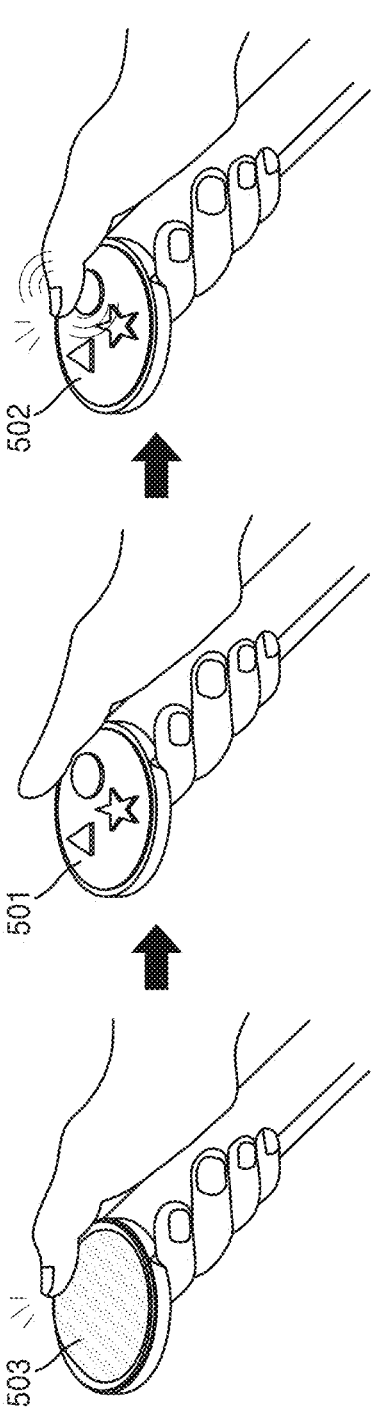
FIG. 5 illustrates an embodiment of applying a soft haptic device to a haptic device, according to an embodiment.

When the sensing signal S402 is generated, the soft haptic device 120 may adjust a frequency of a voltage supplied from a power supply connected to the substrate layer 106 beneath the patterned electrode 103, and the soft electrode 104, and provide a user with vibration feedback corresponding to the user input. For example, when the user input is a press, the sensor 108 may change the intensity of the vibration feedback depending on the intensity of a pressure. In this way, the soft haptic device 120 may be used like a physical button, since the soft haptic device 120 may recognize a press through the built-in sensor 108. FIG. 5 illustrates an embodiment 500 in which the soft haptic device of the disclosure is applied to a haptic device.

According to an embodiment, the soft haptic device may initially maintain a flat shape 503 with buttons not protruded. At this time, when a user touches a location where a sensor is built in, a three-dimensional shape 501 capable of functioning as a button may be protruded. Since the shape of the button depends on the design of a patterned electrode of a soft actuator, the patterned electrode may be designed in a form such as the three-dimensional shape 501 shown in FIG. 5. When the user presses a protruded shape 502, a built-in sensor of a sensing unit disposed beneath the soft actuator may recognize the pressing of the button, and accordingly the soft haptic device may provide a feeling of vibration and provide haptic feedback. In addition to the control method described in the embodiment illustrated in FIG. 5, it should be noted that the soft actuator proposed in the disclosure may be utilized in various ways by appropriately combining a function of outputting a reconfigurable shape, a function of recognizing a user input, and a function of providing vibration feedback.

Figure 3:
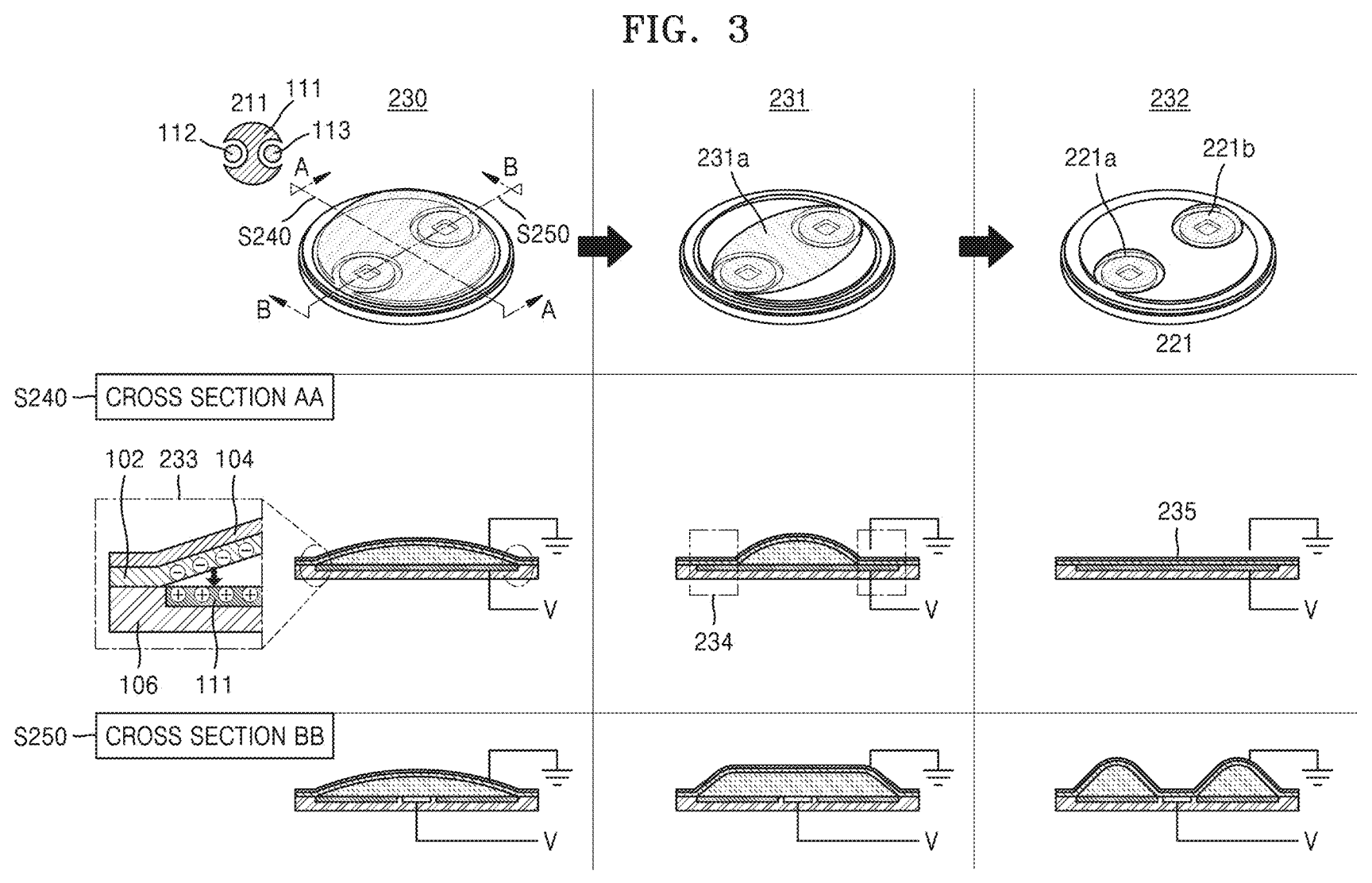

FIG. 3 illustrates a process of reconfiguring the shape of a soft actuator 100, in case 211 where a voltage is applied to a first electrode 111 and no voltage is applied to a second electrode 112 and a third electrode 113, in a state 230 where no voltage is applied initially to a patterned electrode in the soft haptic device 120 shown in FIG. 1, according to an embodiment.

The process of reconfiguring the shape of the soft actuator 100 may include the operation 230 of starting electrical zipping immediately after changing from a state where no voltage is applied to a state where a voltage is applied, the operation 231 of propagating the electrical zipping, and the operation 232 of ending the electrical zipping. When the electrical zipping is ended, a final shape may be generated in the soft actuator. The three operations of reconfiguring the shape of the soft actuator are described with reference to cross sections.

A first cross section AA S240 may be a cross section of crossing the first electrode 111, and a second cross section BB S250 may be a cross section of crossing the three electrodes 111, 112, and 113. When a voltage is applied to the first electrode 111, electrical zipping may occur from an area 233 that is an outermost portion of the first electrode 111 and has the smallest initial gap between the first electrode 111 and the electroactive polymer film 102. This is because an area having the smallest gap between each individual electrode of the patterned electrode to which the voltage is applied and the electroactive polymer film 102 has the greatest electrostatic attractive force. Electrostatic attractive force is explained by the following Equation according to Coulomb's law. As seen from the Equation, electrostatic attractive force between two electric charges is inversely proportional to a distance between the electric charges. Accordingly, the smaller the distance between two electric charges, the greater the electrostatic force.

$$F = \frac{1}{4\pi\epsilon_o} \frac{q_1 q_2}{r^2}$$

Accordingly, electrical zipping may occur starting from an area having the smallest gap between each individual electrode of the patterned electrode to which the voltage is applied and the electroactive polymer film 102, and as the low-rigidity and soft electroactive polymer film 102 sticks (234) to each individual electrode of the patterned electrode to which the voltage is applied, the electrical zipping may propagate to another area 231 of the soft actuator. In FIG. 3, the electrical zipping may occur from the area 233 having the smallest initial gap between the first electrode 111 and the electroactive polymer film 102, and as the electroactive polymer film 102 sticks (234) to the first electrode 111, the electrical zipping may propagate toward a central portion of the soft actuator. And, an intermediate shape 231 appears in the operation of propagating the electrical zipping. The intermediate shape 231 is a form in which the dielectric liquid 105 inside the soft actuator is aggregated on the second electrode 112, the third electrode 113, and part of the first electrode 111.

When the electrical zipping keeps propagating and is finally all completed up to a central portion of the first electrode 111 to which the voltage is applied, the shape of the first cross section AA S240 of the soft actuator may be such that the electroactive polymer film 102 completely sticks (235) to the first electrode 111. In this process, the dielectric liquid 105 inside the soft actuator may flow to areas where no electrostatic attractive forces act between the electroactive polymer film 102 and a plurality of the individual electrodes 111 to 113 constituting the patterned electrode and thus no resistance is applied to a flow of the dielectric liquid 105, that is, to areas 112 and 113 where no voltage is applied. The electroactive polymer film 102 may be stretched by a hydraulic pressure generated by the flow of the dielectric liquid 105. A final output shape of the soft actuator 100 may be determined when a restoring force of the stretched electroactive polymer film 102, a pressure of the dielectric liquid 105, and an electrostatic force acting between the first electrode 111 to which the voltage is applied and the soft electrode 104 disposed on the electroactive polymer film 102 are balanced. The first three-dimensional shape 221 is a final shape that is output after the ending of the electrical zipping, and may be two hemispherical shapes 221a and 221b formed by segmenting and separating the internal dielectric liquid 105.

Figure 6:
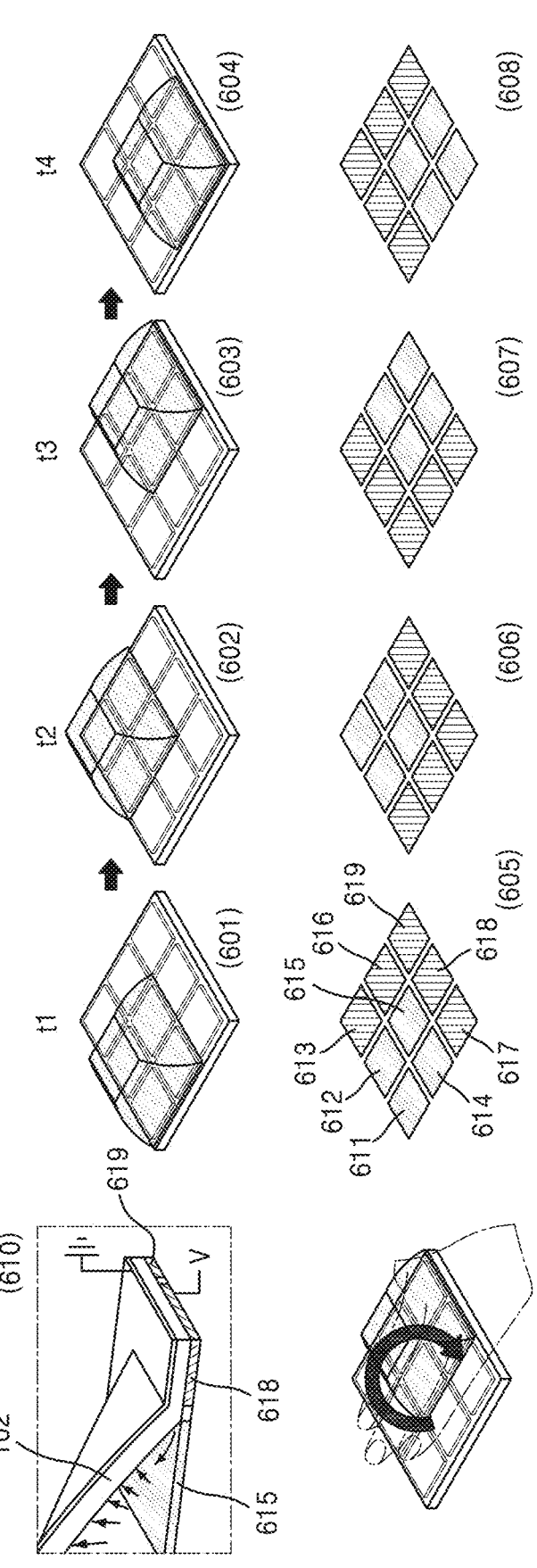
FIGS. 6 and 7 illustrate an example of performing local control by using a patterned electrode, according to an embodiment.

FIG. 6 illustrates an example of performing local control by using a patterned electrode, according to an embodiment.

In an embodiment, the inside of a soft actuator may be physically connected. Accordingly, an internal dielectric liquid may in-plane flow on the patterned electrode. By locally controlling the patterned electrode, the dielectric liquid may in-plane flow. Accordingly, an internal dielectric liquid may in-plane flow on the patterned electrode. By locally controlling the patterned electrode, the dielectric liquid may flow along in-plane direction.

As the dielectric liquid flows, the dielectric liquid may exert stretching to the electroactive polymer film 102. An embodiment of FIG. 6 illustrates an example of dynamic patterns 601 to 604 in which the dielectric liquid in-plane flows clockwise during time t1 to t4 and applying 605 to 608 a voltage to the patterned electrode in each of stages for the dynamic patterns 601 to 604.

A first shape 601 output at time t1, a second shape 602 output at time t2, a third shape 603 output at time t3, and a fourth shape 604 output at time t4 may be generated through first to fourth methods 605 to 608 of individually controlling the patterned electrode, respectively.

The patterned electrode shown in FIG. 6 may consist of a total of nine individual electrodes 611 to 619. At this time, the electrodes expressed by a dot pattern represent electrodes to which no voltage is applied. In this case, electrostatic force may not act between the electroactive polymer film 102 and the electrode 615 to which no voltage is applied, and thus the dielectric liquid may be gathered (610) between the electroactive polymer film 102 and the electrode 615 to which no voltage is applied.

The electrodes expressed by a comb pattern represent electrodes to which a voltage is applied. In this case, strong electrostatic attractive force may act between the electroactive polymer film 102 and the electrodes 618 and 619 to which a voltage is applied, and thus electrical zipping may occur in which the electroactive polymer film 102 sticks to the electrodes 618 and 619 to which the voltage is applied.

The dielectric liquid may be aggregated on four adjacent individual electrodes in each of first to fourth stages t1 to t4, and a location where the dielectric liquid is aggregated may be changed with time.

Referring to an example 605 of applying a voltage in the first stage t1 601, electrical zipping in a corresponding area may occur by applying a voltage to some individual electrodes 613 and 616 to 619 among the nine individual patterned electrodes 611 to 619. Owing to this, the dielectric liquid may be aggregated on the electrodes 611, 612, 615, and 616 to which no voltage is applied.

In the second stage t2 602, supplying power to the two electrodes 613 and 616 among the five electrodes 613 and 616 to 619 to which the voltage has been applied in the previous stage may be stopped. At the same time, a voltage may be applied to the two electrodes 611 and 614 among the four electrodes 611, 612, 614, and 615 to which no voltage has been applied in the first stage t1 601. Owing to this, the dielectric liquid aggregated on the electrodes 611, 612, 614, and 615 to which no voltage has been applied in the first stage t1 601 may flow to the electrodes 612, 613, 615, and 616 to which no voltage is applied in the second stage t2 602. The third stage t3 603 and the fourth stage t4 604 may also operate similarly.

If the duration of the first stage t1 601 to the fourth stage t4 604 is short within 0.1 second, the soft actuator may locally control the dielectric liquid to flow clockwise. At this time, a user may feel clockwise tactile feedback when placing his/her fingers on a surface of the soft actuator. The user may feel smooth, continuous, and dynamic tactile feedback since the dielectric liquid delivers the tactile feedback to the user while in-plane flowing directly.

Figure 7:
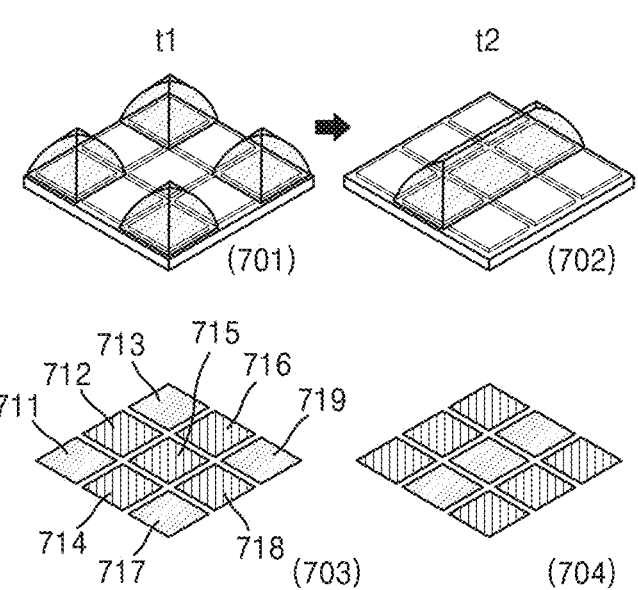

FIG. 7 illustrates an example of locally controlling an aggregation area and an aggregation location where a dielectric liquid is aggregated through a patterned electrode in a soft actuator, according to another embodiment.

Since the in-plane flow of the dielectric liquid is free within the entire area of the patterned electrode, a dynamic pattern may be implemented in the form of segmenting the dielectric liquid and/or aggregating the dielectric liquid.

Referring to FIG. 7, at time t1, the soft actuator may control the patterned electrode to segment the dielectric liquid (701). A voltage may be applied to five patterned electrodes 712, 714, 715, 716, and 718 and no voltage may be applied to four patterned electrodes 711, 713, 717, and 719 among nine patterned electrodes (703). The dielectric liquid may be aggregated simultaneously in four locations corresponding to the electrodes 711, 713, 717, and 719 to which no voltage is applied. In this case, the dielectric liquid may have a shape that is reconfigured in the segmented form.

Then, at time t2, a location where voltage is applied may be changed and thus, no voltage may be applied to three electrodes 714, 715 and 716 and voltage may be applied to the remaining six electrodes 711 to 713 and 717 to 719 among the nine patterned electrodes (704). When the voltage-applied electrodes 711 to 713 and 717 to 719 are adjacent to one another, the dielectric liquid may be reconfigured in an aggregated shape (702).

According to an embodiment, a soft haptic device may output various reconfigurable shapes from a single device through local control. The soft haptic device has the effect of enabling the output of shapes such as letters through the design of a patterned electrode.

Also, the soft haptic device may accept an input such as a user's touch or gesture through a built-in sensor. Through this, when a user makes a specific gesture at a desired moment, a specific shape may be output through local control of a soft actuator. In addition, vibration feedback may be provided to the user by adjusting a frequency of a voltage applied to the soft actuator.

Methods of embodiments of the disclosure may be implemented in the form of program instructions executable through various computer means, and be recorded on a computer-readable medium. The computer-readable medium may include program instructions, data files, data structures, etc., singly or in combination. The program instructions recorded on the medium may be specially designed and configured for the disclosure or may be known to and usable by those skilled in the art of computer software.

As described above, although the disclosure has been described with reference to limited embodiments and drawings, the disclosure is not limited to the above embodiments, and various modifications and variations may be made from these descriptions by those skilled in the art to which the disclosure pertains.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A soft haptic device comprising:
a soft actuator comprising:
an electroactive polymer film;
a patterned electrode; and
a dielectric liquid injected between the electroactive polymer film and the patterned electrode,
wherein the soft actuator is configured to generate a reconfigurable shape such that a form of an output shape and a number of outputtable shapes are changed depending on a number of electrodes constituting the patterned electrode, a shape of the electrodes, and an arrangement of the electrodes, and
the dielectric liquid generates a hydraulic pressure as the dielectric liquid flows to an area where no electrostatic attractive force acts between the electroactive polymer film and the patterned electrode and no resistance is applied to a flow of the dielectric liquid, and the electroactive polymer film is stretched due to the hydraulic pressure.

2. The soft haptic device of claim 1, wherein the soft actuator is further configured to generate the reconfigurable shape when a restoring force of the electroactive polymer film stretched due to the hydraulic pressure, a pressure of the dielectric liquid, and an electrostatic force acting between the patterned electrode and a soft electrode disposed on the electroactive polymer film are in equilibrium.

3. The soft haptic device of claim 2, wherein, when a voltage is applied to the patterned electrode, electrical zipping occurs from an area where an initial gap is smallest between an outermost portion of an individual electrode constituting the patterned electrode to which the voltage is applied and the electroactive polymer film and the electrical zipping ends when the restoring force of the electroactive polymer film, the pressure of the dielectric liquid, and the electrostatic force acting between the patterned electrode and the soft electrode disposed on the electroactive polymer film are in equilibrium.

4. The soft haptic device of claim 1, wherein local control of the soft actuator is performed through the patterned electrode.

5. The soft haptic device of claim 4, wherein the form of the output shape is changed through the local control.

6. The soft haptic device of claim 4, wherein the form of the output shape is dynamically changed through the local control.

7. The soft haptic device of claim 4, wherein the soft actuator performs the local control to segment and dispose the dielectric liquid in a fluid path.

8. The soft haptic device of claim 1, further comprising a sensing unit comprising a sensor disposed under a substrate layer beneath the patterned electrode and configured to recognize an input applied to the soft actuator.

9. The soft haptic device of claim 8, wherein the input applied to the soft actuator comprises a touch, a press, and a gesture.

10. The soft haptic device of claim 8, wherein when a sensing signal is generated from the sensing unit, vibration feedback is provided by adjusting a frequency of a voltage applied to the soft actuator.

11. A local control method of a soft haptic device, the local control method comprising:
starting electrical zipping in an area where an initial gap is smallest between an outermost portion of an individual electrode constituting a patterned electrode to which a voltage is applied and an electroactive polymer film in a soft actuator comprising a dielectric liquid injected between the electroactive polymer film and the patterned electrode;
propagating the electrical zipping when the dielectric liquid generates a hydraulic pressure as the dielectric liquid starts to flow from the area where the initial gap is smallest and flows to an area where no electrostatic attractive force acts between the electroactive polymer film and the patterned electrode and no resistance is applied to a flow of the dielectric liquid; and
ending the electrical zipping when a restoring force of the electroactive polymer film caused by the stretching of the electroactive polymer film due to the hydraulic pressure, a pressure of the dielectric liquid, and an electrostatic force acting between the patterned electrode and the soft electrode disposed on the electroactive polymer film are in equilibrium.

12. The local control method of claim 11, further comprising sensing a user input in a sensing unit disposed under the substrate layer beneath the patterned electrode.

13. The local control method of claim 12, further comprising providing vibration feedback by adjusting a frequency of a voltage applied to the soft actuator, when a sensing signal is generated from the sensing unit.

14. The local control method of claim 11, wherein local control of the soft actuator is performed through the patterned electrode.

15. The local control method of claim 11, wherein the soft actuator is configured to generate a reconfigurable shape such that a form of an output shape and a number of outputtable shapes are changed depending on a number of electrodes constituting the patterned electrode, a shape of the electrodes, and an arrangement of the electrodes.

* * * * *